(12) United States Patent
Kim

(10) Patent No.: US 9,212,719 B2
(45) Date of Patent: Dec. 15, 2015

(54) SHOCK ABSORBER

(71) Applicant: MANDO CORPORATION, Pyeongtaek-si, Gyeonggi-do (KR)

(72) Inventor: Tae Ju Kim, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/304,107

(22) Filed: Jun. 13, 2014

(65) Prior Publication Data

US 2015/0159726 A1 Jun. 11, 2015

(30) Foreign Application Priority Data

Dec. 9, 2013 (KR) .................. 10-2013-0152412

(51) Int. Cl.
*F16F 9/348* (2006.01)
*F16F 9/512* (2006.01)

(52) U.S. Cl.
CPC .................. *F16F 9/512* (2013.01); *F16F 9/348* (2013.01); *F16F 9/5126* (2013.01)

(58) Field of Classification Search
CPC ......... F16F 9/19; F16F 9/3214; F16F 9/3228; F16F 9/3405; F16F 9/348; F16F 9/3485; F16F 9/3481; F16F 9/3482; F16F 9/504; F16F 9/512; F16F 9/5126
See application file for complete search history.

(56) References Cited

FOREIGN PATENT DOCUMENTS

| DE | 2628893 A | * | 1/1978 |
|---|---|---|---|
| JP | 2010038348 A | | 2/2010 |
| KR | 10-0854598 B1 | | 8/2008 |
| KR | 10-1162307 B1 | | 7/2012 |
| WO | WO 2014010343 A1 | * | 1/2014 |

* cited by examiner

*Primary Examiner* — Anna Momper
(74) *Attorney, Agent, or Firm* — Hauptman Ham, LLP

(57) ABSTRACT

In a high-frequency mode (a small-amplitude mode), a shock absorber opens a guide member to reduce a damping force. In a low-frequency mode (a large-amplitude mode), the shock absorber prevents the guide member from being opened by increasing a pressure of a second pressure chamber formed between a second piston (lower piston) and a pilot valve through a groove (passage) formed in an outer periphery of a piston rod. A main damping force is generated through the second pressure chamber and a disk valve assembly. Therefore, it is possible to provide a round ride comfort having a damping feeling and ensure a steering stability through a linear vehicle control.

6 Claims, 3 Drawing Sheets

SHOCK ABSORBER

CROSS-REFERENCE(S) TO RELATED APPLICATION

This application claims priority of Korean Patent Application No. 10-2013-0152412, filed on Dec. 9, 2013, in the Korean Intellectual Property Office, the contents of which are incorporated herein by reference in its entirety.

BACKGROUND OF THE INVENTION

1. Field of the Invention

The present invention relates to a shock absorber, and more particularly, to a shock absorber which is capable of achieving a pressure-sensitive characteristic by using a pilot valve and controlling a variable frequency characteristic, which is input from a road surface, through a lateral passage formed by an open of a guide member.

2. Description of the Related Art

Generally, a shock absorber is designed to support a weight of a vehicle body and suppress and dampen a vibration transferred from a road surface to the vehicle body, contributing to improving a ride comfort and protecting loaded goods and various parts of a vehicle.

Such a shock absorber includes a cylinder filled with a working fluid (oil), a reciprocating piston rod connected to a vehicle body, and a piston valve connected to a lower end of the piston rod to slide within the cylinder and control a flow of the working fluid.

In the case of a high functional damper (HFD), a conventional shock absorber is effective in a high-speed degressive characteristic and an ultra-low-speed tuning, but cannot variably control a damping force generated in a high-frequency mode and a low-frequency mode. Hence, the conventional shock absorber has a limitation in improving a ride comfort.

CITATION LIST

Patent Literature (Patent Literature 1) Korean Patent Application No. 10-2007-0049256
(Patent Literature 2) Korean Patent Application No. 10-2007-0067515
(Patent Literature 3) Japanese Patent Application Publication No. 2010-38348

SUMMARY OF THE INVENTION

The present invention has been made in an effort to solve the above problems and is directed to provide a shock absorber that implements a pressure-sensitive characteristic by using a pilot valve and controls a variable frequency characteristic, which is input from a road surface, through a lateral passage formed by an open of a guide member, thereby providing a round ride comfort having a damping feeling and ensuring a steering stability through a linear vehicle control.

According to the present invention, a shock absorber includes: a piston rod reciprocating within a cylinder and having a groove formed in an outer periphery thereof; a first piston connected to an end of the piston rod and forming an internal space recessed downward, the first piston including a first pressure chamber through which a working fluid flows during a rebound stroke, and a third pressure chamber which is connected to a compression passage passing therethrough in a vertical direction; a pilot valve connected to the end of the piston rod and disposed in the internal space to selectively open or close a lower end of the first pressure chamber; a second piston which is connected to the end of the piston rod and of which an upper portion is received in the internal space such that the second piston is disposed below the first piston, the second piston including a second pressure chamber connected to the first pressure chamber, and a slit for communicating the second pressure chamber with the groove; a guide member connected along an edge of the pilot valve to cover an upper outer periphery of the second piston and move upward and downward while interlocking with the pilot valve; a rebound retainer connected to the end of the piston rod and disposed below the second piston, the rebound retainer including a fourth pressure chamber connected to the second pressure chamber; and a disk valve assembly connected to the end of the piston rod and disposed below the rebound retainer to open or close a passage of the fourth pressure chamber.

In a high-frequency mode (a small-amplitude mode), the guide member may be opened such that the working fluid reduces a damping force while passing through the first pressure chamber and the third pressure chamber. In a low-frequency mode (a large-amplitude mode), the guide member may be prevented from being opened by increasing a pressure of the second pressure chamber formed between the second piston (lower piston) and the pilot valve through the groove formed in the outer periphery of the piston rod, and the working fluid generates a main damping force while sequentially passing through the first pressure chamber, the second pressure chamber, and the fourth pressure chamber.

The disk valve assembly may include: a slit disk having a slit communicating with an extension rebound passages along an edge thereof and tightly disposed below the rebound retainer; and a main disk including a plurality of unit disks stacked below the slit disk.

The guide member may include: a ring-shaped fixing piece connected along the edge of the pilot valve; and a cover piece extending from an edge of the fixing piece and facing the upper outer periphery of the second piston, and a top surface of the fixing piece may open or close a lower edge of a rebound passage.

The shock absorber may further include: a ring coupling groove recessed along an outer periphery of the second piston; and a ring-shaped sealing member mounted on the ring coupling groove to face an inner periphery of the guide member.

DETAILED DESCRIPTION OF EXEMPLARY EMBODIMENTS

Hereinafter, a shock absorber according to a preferred embodiment of the present invention will be described with reference to the accompanying drawings.

Figure 1:
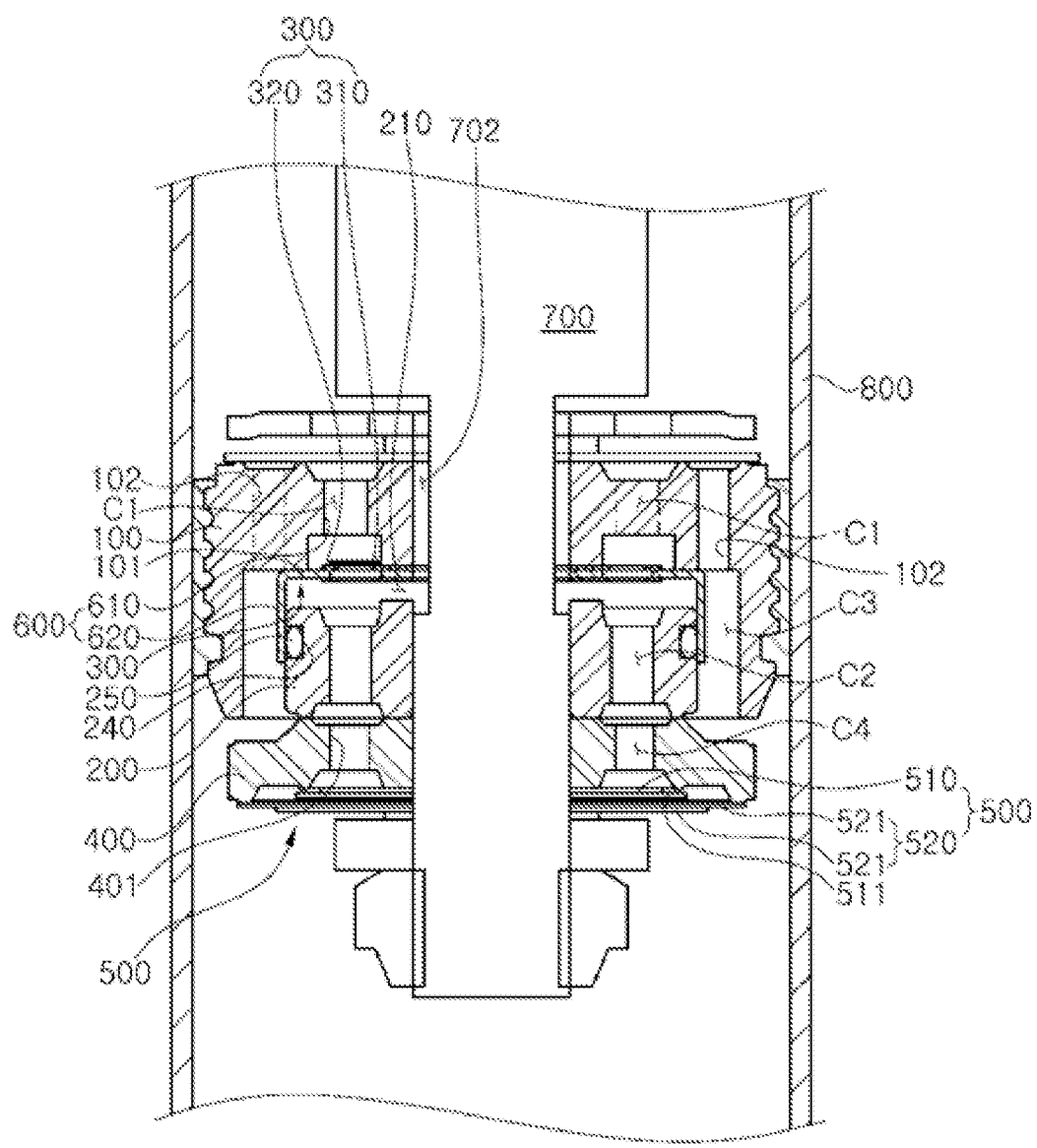
FIG. 1 is a cross-sectional conceptual diagram illustrating an overall configuration of a shock absorber according to an embodiment of the present invention.
Figure 2:
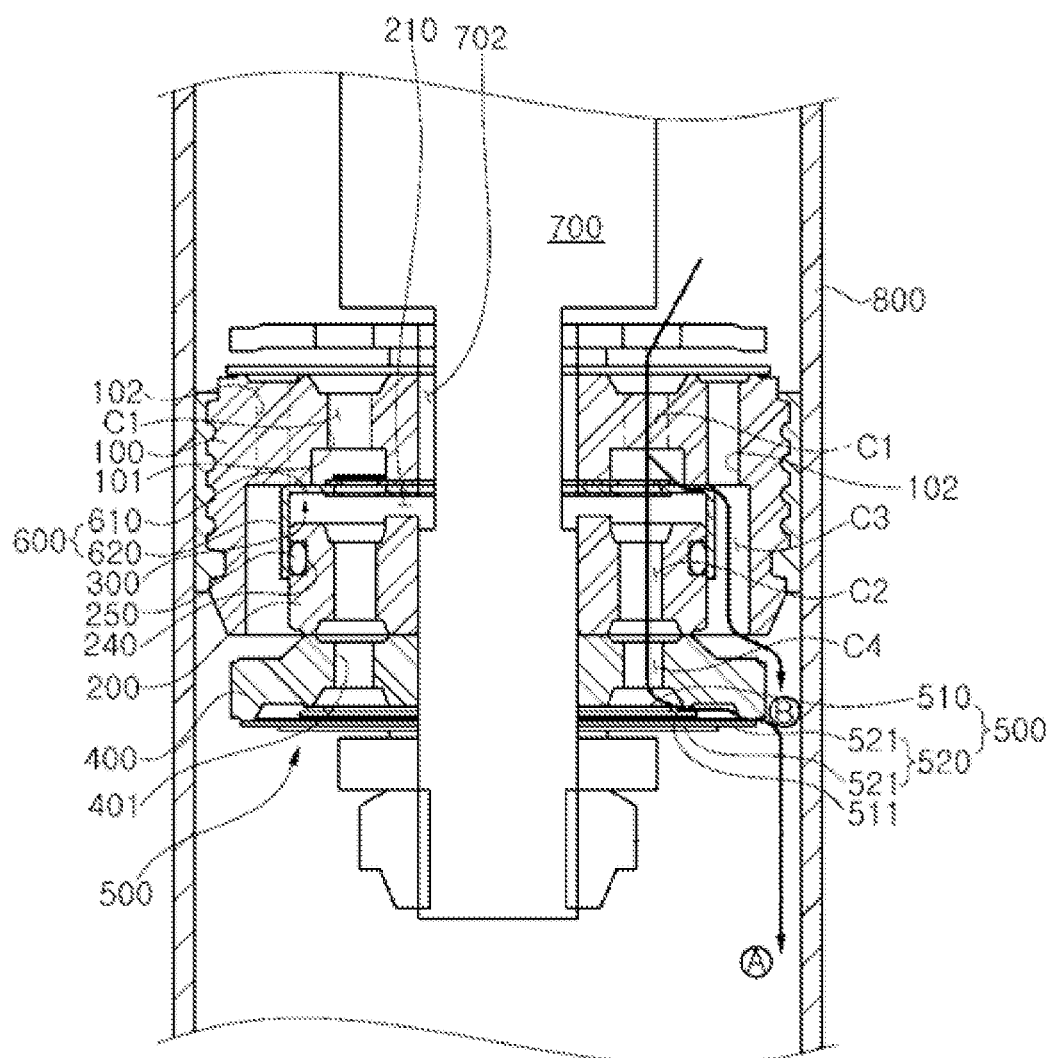
FIG. 2 is a cross-sectional conceptual diagram illustrating a flow of a working fluid in a high-frequency mode (a small-amplitude mode) during a rebound stroke in the shock absorber according to the embodiment of the present invention.
Figure 3:
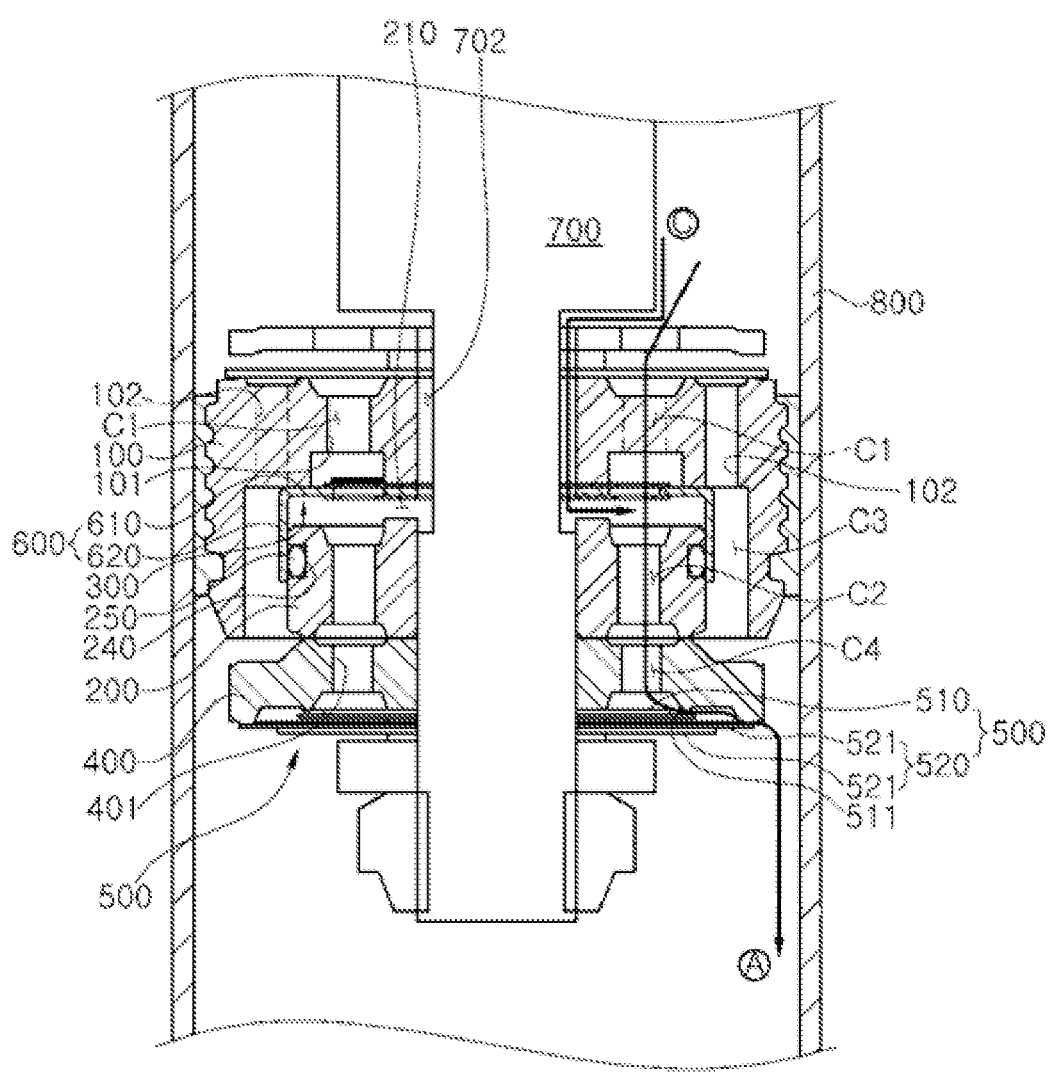
FIG. 3 is a cross-sectional conceptual diagram illustrating a flow of a working fluid in a low-frequency mode (a large-amplitude mode) during a rebound stroke in the shock absorber according to the embodiment of the present invention.

FIG. 1 is a cross-sectional conceptual diagram illustrating an overall configuration of a shock absorber according to an embodiment of the present invention, FIG. 2 is a cross-sectional conceptual diagram illustrating a flow of a working fluid in a high-frequency mode (a small-amplitude mode) during a rebound stroke in the shock absorber according to the embodiment of the present invention, and FIG. 3 is a cross-sectional conceptual diagram illustrating a flow of a working fluid in a low-frequency mode (a large-amplitude mode) during a rebound stroke in the shock absorber according to the embodiment of the present invention.

Referring to FIGS. 1 to 3, the shock absorber according to the preferred embodiment of the present invention includes a piston rod 700, a first piston 100, a pilot valve 300, a second piston (lower piston) 200, a guide member 600, a rebound retainer 400, and a disk valve assembly 500.

The piston rod 700 is installed to be reciprocable within a cylinder 800, and a groove (passage) 702 is formed in the outer periphery of the piston rod 700.

The first piston 100 is connected to an end of the piston rod 700. The first piston 100 includes a first pressure chamber C1, through which a working fluid flows during a rebound stroke, and a third pressure chamber C3 connected to a compression passage 102 passing therethrough in a vertical direction. A recessed internal space is formed in a lower portion of the first piston 100.

The second piston 200 is connected to the end of the piston rod 700, and an upper portion of the second piston 200 is received in the internal space, such that the second piston 200 is disposed below the first piston 100. The second piston 200 includes a second pressure chamber C2 connected to the first pressure chamber, and a slit 210 for communicating the second chamber C2 with the groove 702.

The pilot valve 300 is connected to the piston rod 700 and is disposed in the internal space. The pilot valve 300 functions to selectively open or close a lower end of the first pressure chamber C1.

The pilot valve 300 includes a pilot slit disk 310 and a pilot disk 320 disposed below the pilot slit disk 310.

The guide member 600 is installed at a position that is connected along an edge of the pilot valve 300 and covers an upper outer periphery of the second piston 200. The guide member 600 is configured to move upward and downward while interlocking with the pilot valve 300.

The rebound retainer 400 is connected to the end of the piston rod 700 and is disposed below the second piston 200. The rebound retainer 400 includes a fourth pressure chamber C4 connected to the second pressure chamber C2.

The disk valve assembly 500 is connected to the end of the piston rod 700 and is disposed below the rebound retainer 400 to open or close a passage of the fourth pressure chamber C4.

The disk valve assembly 500 includes a slit disk 510 and a main disk 520. The slit disk 510 includes a slit 511 communicating with an extension rebound passages 401 along an edge thereof and is tightly disposed below the rebound retainer 400. The main disk 520 includes a plurality of unit disks 521 stacked below the slit disk 510.

The guide member 600 includes a ring-shaped fixing piece 610 connected along the edge of the pilot valve 300, and a cover piece 620 extending from the edge of the fixing piece 610 and facing the upper outer periphery of the second piston 200.

The fixing piece 610 is a ring-shaped member that is connected along the edge of the pilot valve 300. The cover piece 620 extends from the edge of the fixing piece 610 and faces the upper outer periphery of the second piston 200. A top surface of the fixing piece 610 opens or closes a lower edge of a rebound passage 101.

In the shock absorber according to the preferred embodiment of the present invention, in a high-frequency mode (a small-amplitude mode), the guide member 600 is opened so that the working fluid reduces a damping force while passing through the first pressure chamber C1 and the third pressure chamber C3. In a low-frequency mode (a large-amplitude mode), the pressure of the second pressure chamber C2 formed between the second piston (lower piston) 200 and the pilot valve 300 is increased through the groove 702 formed in the outer periphery of the piston rod 700 and the slit 210 of the second piston 200. Therefore, the guide member 600 is prevented from being opened, and the working fluid generates a main damping force while sequentially passing through the first pressure chamber C1, the second pressure chamber C2, and the fourth pressure chamber C4.

The shock absorber according to the preferred embodiment of the present invention includes a ring coupling groove 240 recessed along the outer periphery of the second piston 200, and a ring-shaped sealing member 250 mounted on the ring coupling groove 240 to face an inner periphery of the guide member 600.

The operation of the shock absorber configured as above, according to the preferred embodiment of the present invention, will be described below.

As illustrated in FIG. 2, in the high-frequency mode (the small-amplitude mode) during the rebound stroke, the working fluid generates the main damping force while passing through a working passage A and the disk valve assembly 500. In addition, when the working fluid passes through a working passage B, the guide member is opened and the working fluid reduces the damping force while passing through the first pressure chamber C1 and the third pressure chamber C3.

On the other hand, as illustrated in FIG. 3, in the low-frequency mode (the large-amplitude mode) during the rebound stroke, the working fluid passes through the working passage C. At this time, the working fluid increases the pressure of the second pressure chamber C2 formed between the second piston (lower piston) 200 and the pilot valve 300 through the groove 702 formed in the outer periphery of the piston rod 700 and the slit 210 of the second piston 200. The increase in the pressure of the second pressure chamber C2 prevents the guide member 600 from being opened. Therefore, the working fluid generates the damping force while passing through the working passage A and the disk valve assembly 500. In a middle-speed mode, the guide member 600 is opened again by the pressure of the upper portion of the piston.

As described above, according to the present invention, in the high-frequency mode (the small-amplitude mode), the guide member is opened to reduce the damping force, and in the low-frequency mode (the large-amplitude mode), the guide member is prevented from being opened by increasing the pressure of the second pressure chamber formed between the second piston (lower piston) and the pilot valve through the groove formed in the outer periphery of the piston rod. The main damping force is generated through the second pressure chamber and the disk valve assembly. Therefore, it is possible to provide a round ride comfort having a damping feeling and ensure a steering stability through a linear vehicle control.

While the embodiments of the present invention have been described with reference to the specific embodiments, it will be apparent to those skilled in the art that various changes and

DESCRIPTION OF REFERENCE NUMERALS

100: first piston
101: rebound passage
102: compression passage
200: second piston
210: slit
240: ring coupling groove
250: sealing member
300: pilot valve
310: pilot disk-S
320: pilot disk
400: rebound retainer
401: extension rebound passage
500: disk valve assembly
510: disk-S
511: slit
520: main disk
521: unit disk
600: guide member
610: fixing piece
620: cover piece
700: piston rod
702: groove
800: cylinder
C1: first pressure chamber
C2: second pressure chamber
C3: third pressure chamber
C4: fourth pressure chamber

What is claimed is:

1. A shock absorber comprising:
a piston rod reciprocating within a cylinder and having a groove formed in an outer periphery thereof;
a first piston connected to an end of the piston rod and forming an internal space recessed downward, the first piston including a first pressure chamber through which a working fluid flows during a rebound stroke, and a third pressure chamber which is connected to a compression passage passing therethrough in a vertical direction;
a pilot valve connected to the end of the piston rod and disposed in the internal space to selectively open or close a lower end of the first pressure chamber;
a second piston which is connected to the end of the piston rod and of which an upper portion is received in the internal space such that the second piston is disposed below the first piston, the second piston including a second pressure chamber connected to the first pressure chamber, and a slit for communicating the second pressure chamber with the groove;
a guide member connected along an edge of the pilot valve to cover an upper outer periphery of the second piston and move upward and downward while interlocking with the pilot valve;
a rebound retainer connected to the end of the piston rod and disposed below the second piston, the rebound retainer including a fourth pressure chamber connected to the second pressure chamber; and
a disk valve assembly connected to the end of the piston rod and disposed below the rebound retainer to open or close a passage of the fourth pressure chamber.

2. The shock absorber according to claim 1, wherein
in a high-frequency mode, the guide member is opened such that the working fluid reduces a damping force while passing through the first pressure chamber and the third pressure chamber, and
in a low-frequency mode, the guide member is prevented from being opened by increasing a pressure of the second pressure chamber formed between the second piston and the pilot valve through the groove formed in the outer periphery of the piston rod, and the working fluid generates a main damping force while sequentially passing through the first pressure chamber, the second pressure chamber, and the fourth pressure chamber.

3. The shock absorber according to claim 1, wherein the disk valve assembly comprises:
a slit disk having a slit communicating with an extension rebound passages along an edge thereof and tightly disposed below the rebound retainer; and
a main disk including a plurality of unit disks stacked below the slit disk.

4. The shock absorber according to claim 1, wherein the guide member comprises:
a ring-shaped fixing piece connected along the edge of the pilot valve; and
a cover piece extending from an edge of the fixing piece and facing the upper outer periphery of the second piston, and a top surface of the fixing piece_opens or closes a lower edge of a rebound passage.

5. The shock absorber according to claim 1, further comprising:
a ring coupling groove recessed along an outer periphery of the second piston; and
a ring-shaped sealing member mounted on the ring coupling groove to face an inner periphery of the guide member.

6. A shock absorber comprising:
a piston rod having a groove in an outer periphery thereof;
a first piston connected to an end of the piston rod and forming an internal space recessed downward, the first piston including a first pressure chamber through which a working fluid flows during a rebound stroke, and a third pressure chamber connected to a compression passage passing therethrough in a vertical direction;
a second piston having a slit for communicating with the groove, wherein a pilot valve is connected to the piston rod and is disposed in the internal space to selectively open or close a lower end of the first pressure chamber;
the second piston is connected to the end of the piston rod, an upper portion of the second piston is received in the internal space such that the second piston is disposed below the first piston, and the second piston includes a second pressure chamber connected to the first pressure chamber; and
a guide member is connected along an edge of the pilot valve and is configured to cover an upper outer periphery of the second piston and move upward and downward while interlocking with the pilot valve.

* * * * *